United States Patent [19]

Shimei et al.

[11] Patent Number: 4,799,404
[45] Date of Patent: Jan. 24, 1989

[54] INTERMEDIATE SHIFT CONTROL APPARATUS FOR AUTOMATIC TRANSMISSION

[75] Inventors: Masato Shimei, Nagoya; Shigeki Goto, Toyota; Shigeo Takahashi, Anjo, all of Japan

[73] Assignee: Aisin Seiki Kabushiki Kaisha, Kariya, Japan

[21] Appl. No.: 29,606

[22] Filed: Mar. 24, 1987

[30] Foreign Application Priority Data

Mar. 24, 1986 [JP] Japan .................................. 61-63946

[51] Int. Cl.$^4$ .............................................. B60K 41/06
[52] U.S. Cl. ..................................... 74/869; 74/752 C
[58] Field of Search ................ 74/867, 868, 869, 740, 74/752 C

[56] References Cited

U.S. PATENT DOCUMENTS

| | | | |
|---|---|---|---|
| 3,367,213 | 2/1968 | Abbott | 74/740 |
| 3,633,890 | 7/1972 | Crooks | 74/740 X |
| 4,222,289 | 9/1980 | Watanabe et al. | 74/740 |
| 4,312,248 | 1/1982 | Sugimoto et al. | 74/740 |
| 4,679,450 | 7/1987 | Hayakawa et al. | 74/740 X |
| 4,688,449 | 8/1987 | Harada et al. | 74/740 |
| 4,690,017 | 9/1987 | Taniguchi et al. | 74/740 X |

Primary Examiner—Leslie A. Braun
Assistant Examiner—Dwight G. Diehl
Attorney, Agent, or Firm—Burns, Doane, Swecker & Mathis

[57] ABSTRACT

A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve. The control apparatus has a third changeover valve for switching the auxiliary transmission mechanism from low to high at a vehicle velocity lower than the changeover velocity of the first changeover valve, and from high to low when the vehicle velocity rises above the changeover velocity of the first changeover valve. The third changeover valve is capable of forming an intermediate speed, such as a 1.5 or 2.5. speed, by changing over the auxiliary transmission mechanism from low to high while the main transmission mechanism is low.

21 Claims, 5 Drawing Sheets

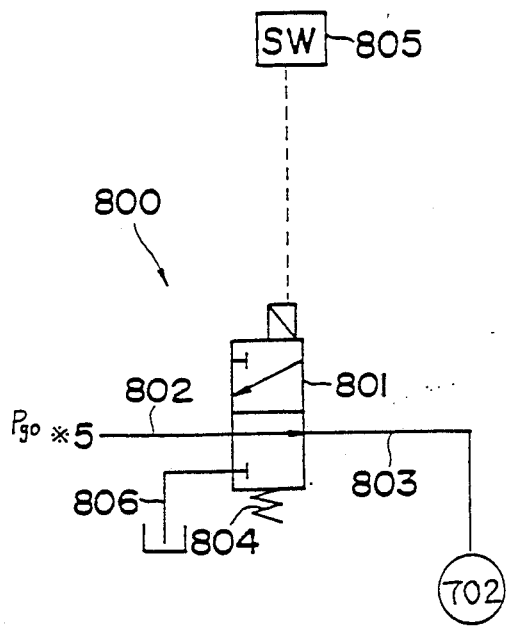
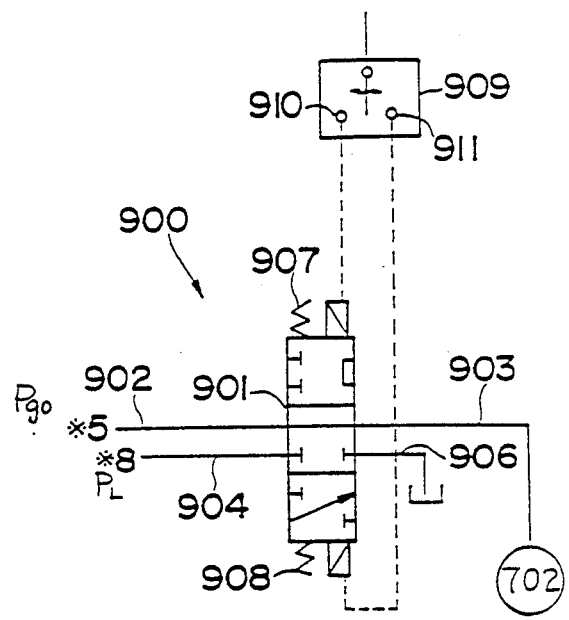
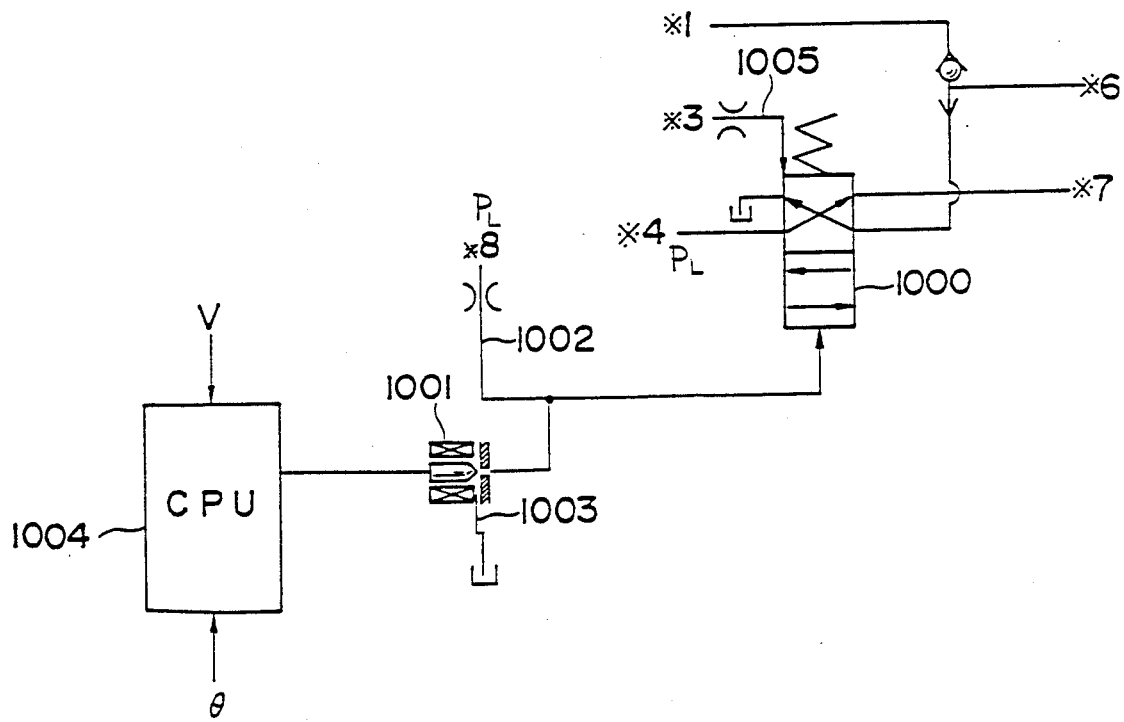

INTERMEDIATE SHIFT CONTROL APPARATUS FOR AUTOMATIC TRANSMISSION

BACKGROUND OF THE INVENTION

This invention relates to a hydraulic control apparatus for an automatic transmission.

An example of a conventional hydraulic control apparatus for controlling an automatic transmission is disclosed in the specification of Japanese Patent Publication (KOKOKU) No. 57-20503. This conventional hydraulic control apparatus is equipped with shift valves the number of which is the same as the number of gear changes made by the automatic transmission. The apparatus is adapted to changeover hydraulic pressure by successively actuating the shift valves one after another for successive speed changes at operating points set in such a manner that governor pressure commensurate with vehicle velocity and throttle commensurate with the amount of accelerator pedal depression act against each other. It is also so arranged that overdrive clutch pressure and overdrive brake pressure are changed over to bring about a fourth speed, namely an overdrive state, from third speed.

In a conventional hydraulic control apparatus of this kind, a changeover between overdrive clutch pressure and overdrive brake pressure can be performed in first or second speed to achieve an intermediate speed, namely a 1.5 or 2.5 speed, respectively, thereby improving the power performance and fuel consumption of the vehicle.

However, when performing an intermediate shift to the 1.5 speed or 2.5 speed as mentioned above, it is necessary to changeover the overdrive pressure whenever such a shift is made. Since the above-described conventional hydraulic control apparatus is so adapted that the operating point of each shift valve is set for a single speed change, control for setting the intermediate speed is difficult in actual practice, even if feasible in terms of mechanical arrangement.

SUMMARY OF THE DISCLOSURE

Accordingly, an object of the present invention is to provide a control apparatus for an automatic transmission wherein intermediate shift speed control is made possible without a major modification in the arrangement of the conventional hydraulic control apparatus for automatic transmissions.

According to the present invention, the foregoing objects are attained by providing a control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, the control apparatus beng characterized by having a third changeover valve for switching the auxiliary transmission mechanism from low to high at a vehicle velocity lower than the changeover velocity of the first changeover valve, and from high to low when the vehicle velocity rises above the changeover velocity of the first changeover valve.

In preferred embodiments of the invention, the third changeover valve is changed over by governor pressure or by a solenoid valve. The control apparatus further includes a fourth changeover valve connected to the third changeover valve and changed over between a state than renders the third changeover valve operative and a state that renders the third changeover valve inoperative. The control apparatus may further include a fifth changeover valve connected to the third changeover valve and switched among a state in which governor pressure is made to act upon the third changeover valve, a state in which line pressure is made to act upon the third changeover valve, and a state in which the third changeover valve is rendered inoperative.

The automatic transmission control apparatus of the present invention is connected to a hydraulic control circuit of an automatic transmission of the type in which the main transmission mechanism is switched from low to high by the first changeover valve as vehicle velocity rises, after which the auxiliary transmission mechanism is switched from low to high by the second changeover valve, thereby forming a plurality of forward speeds. By thus connecting the control apparatus of the invention to the hydraulic control circuit, the third changeover valve changes over the auxiliary transmission mechanism from low to high, while the main transmission mechanism remains low, thereby forming an intermediate speed in a process wherein a shift is made from a first speed in which both the main transmission mechanism and auxiliary transmission mechanism are in the low state to a second speed in which the main transmission mechanism is high and the auxiliary transmission mechanism is low. When the main transmission mechanism is changed over from low to high, the third changeover valve changes over the auxiliary transmission mechanism from high to low, thereby forming the second speed.

As described above, the control apparatus of the present invention is added to the conventional automatic transmission hydraulic control circuit to make it possible for the hydraulic control circuit to form an intermediate speed. This can be accomplished without requiring a major modification in the construction of the conventional hydraulic control circuit. Furthermore, in accordance with the preferred embodiment of the invention, the intermediate speed is formed by changing over a single changeover valve in response to a vehicle velocity signal, and a second speed is formed by changing over this valve in response to a second speed ratio signal. In other words, the arrangement is such that two operations can be performed by a single changeover valve. This means that the overall arrangement can be simplified since only a single changeover valve need be provided. Adding an auxiliary changeover device makes it possible to switch between the conventional apparatus and the apparatus of the invention.

These and other characterizing features of the present invention will become clear from a description of preferred embodiments with reference to the accompanying drawings.

BRIEF DESCRIPTION OF THE DRAWINGS

FIG. 4 is a circuit diagram illustrating an auxiliary changeover device connected to the circuit of FIG. 3;

FIG. 5 is a circuit diagram illustrating another auxiliary changeover device;

FIG. 6 is a circuit diagram illustrating another embodiment of the present invention.

DETAILED DESCRIPTION

The embodiments of the present invention will now be described in detail with reference to the accompanying drawings.

Figure 1:
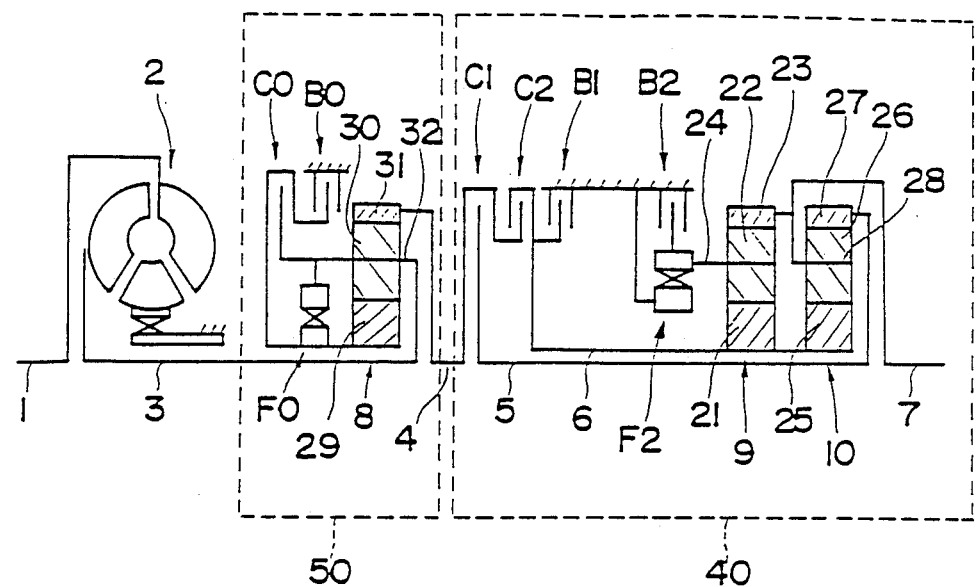
FIG. 1 is a schematic view illustrating the power transmission mechanism of an automatic transmission to which the present invention is applied.

FIG. 1 illustrates an automatic transmission having four forward speeds and one reverse speed and including an overdrive ratio. An output shaft 1 of a prime mover, a torque converter 2, an input shaft 3, intermediate shafts 4, 5, 6, an output shaft 7 and three sets of planetary gear mechanisms 8, 9, 10 are concentrically arranged. Three clutches C0, C1, C2 and three brakes B0, B1, B2 are provided as friction elements for converting the gear ratios of the planetary gear mechanisms 8, 9, 10. The transmission also includes two unidirectional (one way) clutches F0, F2.

The transmission has a main transmission mechanism 40 constituted by the intermediate shaft 4 (the output shaft of an auxiliary transmission mechanism 50, described below), the intermediate shafts 5 and 6, the output shaft 7, the two planetary gear mechanisms 9, 10, the two clutches C1, C2, the two brakes B1, B2, and one of the oneway clutches, namely clutch F2. The output shaft 4 is coupled to the intermediate shafts 5, 6 via the clutches C1, C2, respectively. The planetary gear mechanism 9 is composed of a sun gear 21, planetary pinion 22, ring gear 23 and carrier 24, and the planetary gear mechanism 10 is composed of a sun gear 25, planetary pinion 26, ring gear 27 and carrier 28. The intermediate shaft 5 is connected to a ring gear 27 of the planetary gear mechanism 10. The intermediate shaft 6 is connected to sun gears 21, 25 of the planetary gear mechanisms 9, 10 and is equipped with the brake B1. The output shaft 7 is connected to the ring gear 23 of planetary gear mechanism 9 and to the carrier 28 of the planetary gear mechanism 10. The carrier 24 of planetary gear mechanism 9 is equipped with the unidirectional clutch F2 and brake B2.

The auxiliary transmission mechanism 50, which is arranged forward of main transmission mechanism 40, is constituted by the input shaft 3, the intermediate shaft 4 (which is the output shaft of this auxiliary transmission mechanism), the planetary gear mechanism 8, the clutch C0, the brake B0 and the unidirectional clutch F0. The planetary gear mechanism 8 is composed of a sun gear 29, a planetary pinion 30, a ring gear 31, and a carrier 32. The carrier 32 is connected to the input shaft 3, and the ring gear 31 is connected to the intermediate shaft 4. The clutch C0 and unidirectional clutch F0 are provided between the carrier 32 and sun gear 29. The sun gear 29 is equipped with the brake B0.

Table 1 below illustrates the operation of the clutches C0, C1, C2, brakes B0, B1, B2 and oneway clutches F0, F2 at each speed of the automatic transmission constructed as set forth above.

TABLE 1

| | C0 | C1 | C2 | B0 | B1 | B2 | F0 | F2 | Reduction Ratio |
|---|---|---|---|---|---|---|---|---|---|
| First Speed | | ○ | | | | Δ | * | * | 2.45 |
| Second Speed | | ○ | | | ○ | | * | | 1.45 |
| Third Speed | | ○ | ○ | | | | * | | 1.00 |
| Fourth Speed | | | ○ | ○ | | | | | 0.7 |
| Reverse | | | ○ | | | * | | | 2.22 |

In Table 1, the symbol O indicates that the particular clutch or brake is being actuated by a hydraulic actuating mechanism, the symbol Δ indicates that the brake is being actuated by a hydraulic actuating mechanism when engine braking is necessary, and the symbol * indicates that the particular oneway clutch is locked only when the engine is in drive. Transmission mechanism operation for each gear shift stage is well-known in the art and need not be described here.

Figure 2:
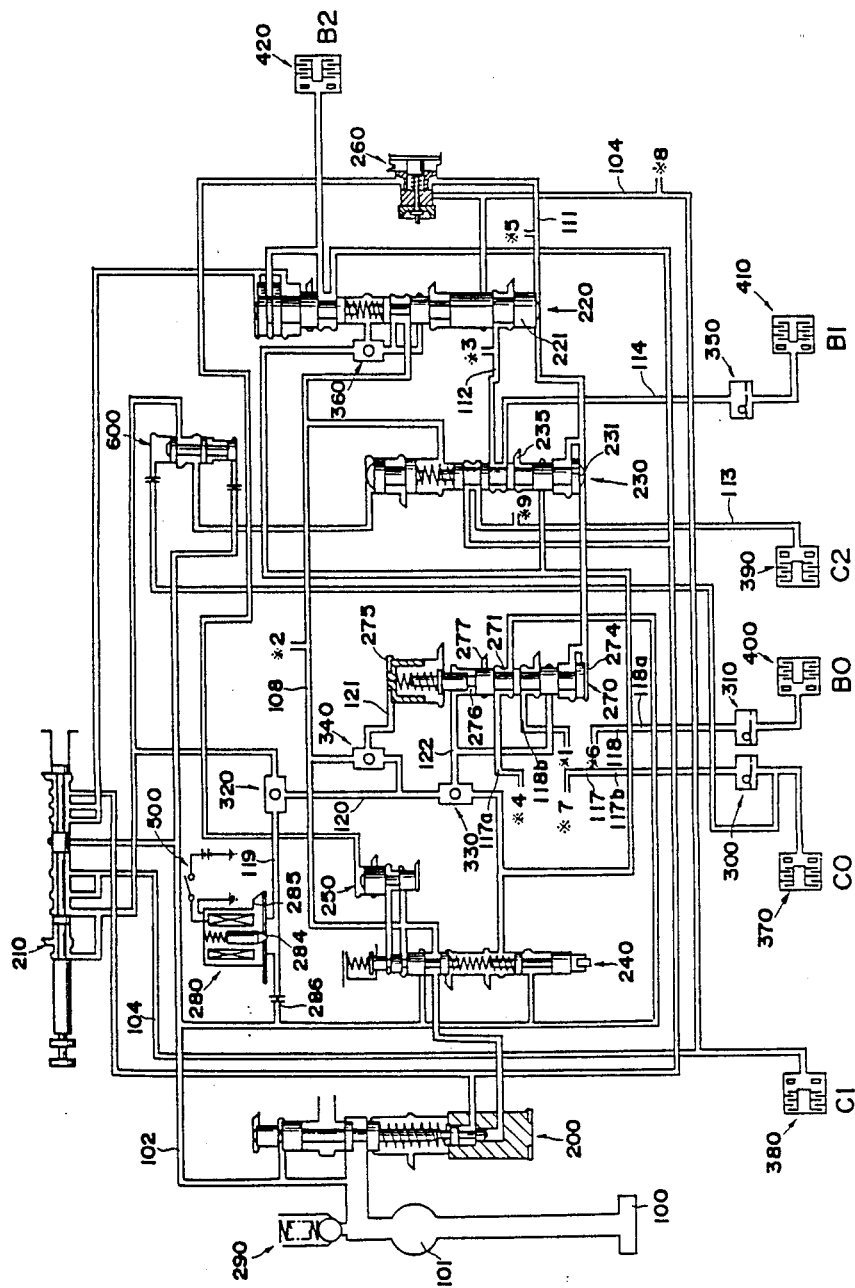
FIG. 2 is a circuit diagram illustrating a hydraulic control circuit for the automatic transmission shown in FIG. 1.

FIG. 2 illustrates a hydraulic control circuit for the automatic transmission shown in FIG. 1. The hydraulic control circuit comprises an oil reservoir 100, an oil pump 101, various valves, namely a pressure regulating valve 200, a selector valve 210, a 1-2 shift valve 220, a 2-3 shift valve 230, a throttle valve 240, a cut-back valve 250, a governor valve 260, an overdrive shift valve 270, a solenoid valve 280, a relief valve 290, a timing valve 600 and check valves 300, 310, 320, 330, 340, 350, 360, hydraulic cylinders 370, 380, 390, 400, 410 and 420 serving as hydraulic chambers of hydraulic pistons for actuating the clutches C0, C1, C2 and brakes B0, B1, B2, as well as various hydraulic circuits arranged between respective ones of these valves and hydraulic cylinders.

In a state where the first speed prevails in the D position, hydraulic pressure delivered from the oil pump 101 to the selector valve 210 via an oil line 102 is introduced to the hydraulic cylinder 380 via an oil line 104, thereby engaging the clutch C1. The hydraulic pressure is also delivered to the governor valve 260. Since the governor pressure of the governor valve 260 is low, spools in the 1-2 shift valve 220, 2-3 shift valve 230 and overdrive shift valve 270 are all situated at their lower positions, as is illustrated in FIG. 2. As a result, hydraulic pressure is delivered from oil line 102 solely to the hydraulic cylinder 370 via the overdrive shift valve 270, thereby engaging the clutch C0.

In second speed, a spool 221 in the 1-2 shift valve 220 is displaced upwardly in FIG. 2 by a rise in the governor pressure of the governor valve 260, so that that pressurized oil from oil line 104 is introduced to the hydraulic cylinder 410 via an oil line 112, the 2-3 shift valve 230 and an oil line 114, thereby engaging the brake B1.

In third speed, a spool 231 in the 2-3 shift valve 230 is displaced upwardly in FIG. 2 by a further rise in the governor pressure of governor valve 260, thereby connecting oil lines 112 and 113 to introduce pressurized oil to the hydraulic cylinder 390, whereby the clutch C2 is engaged, and connecting the oil line 114 to a discharge line 235 so that the pressurized oil is discharged from the hydraulic cylinder 410 to release the brake B1.

In fourth speed (overdrive), an overdrive changeover switch 500 is turned on so that the solenoid valve 280 opens a port 284, whereby pressurized oil, which has been supplied to oil chambers 275, 276 of the overdrive shift valve 270 via an orifice 286, oil line 119, check valve 320, oil line 120, check valves 340, 330 and oil lines 121, 122 to position the spool 271 of shift valve 270 downward in FIG. 2, is discharged from a discharge oil line 285. Throttle pressure from oil line 118 acts upon the oil chamber 274 and, together with governor pressure acting upon an oil chamber 274, controls the spool 271. The spool 271 is displaced upwardly in FIG. 2 by a rise in governor pressure. Accordingly, an oil line 117 is connected to a discharge oil line 277 from the state which prevails in third speed, so that the pressurized oil in the hydraulic cylinder 370 is discharged to release the clutch C0. Concurrently, pressurized oil from an oil line 102 is introduced to the hydraulic cylinder 400 via an oil line 118 to engage the brake B0.

The above-described arrangement is the same as that of a conventional automatic transmission hydraulic control apparatus.

Figure 3:
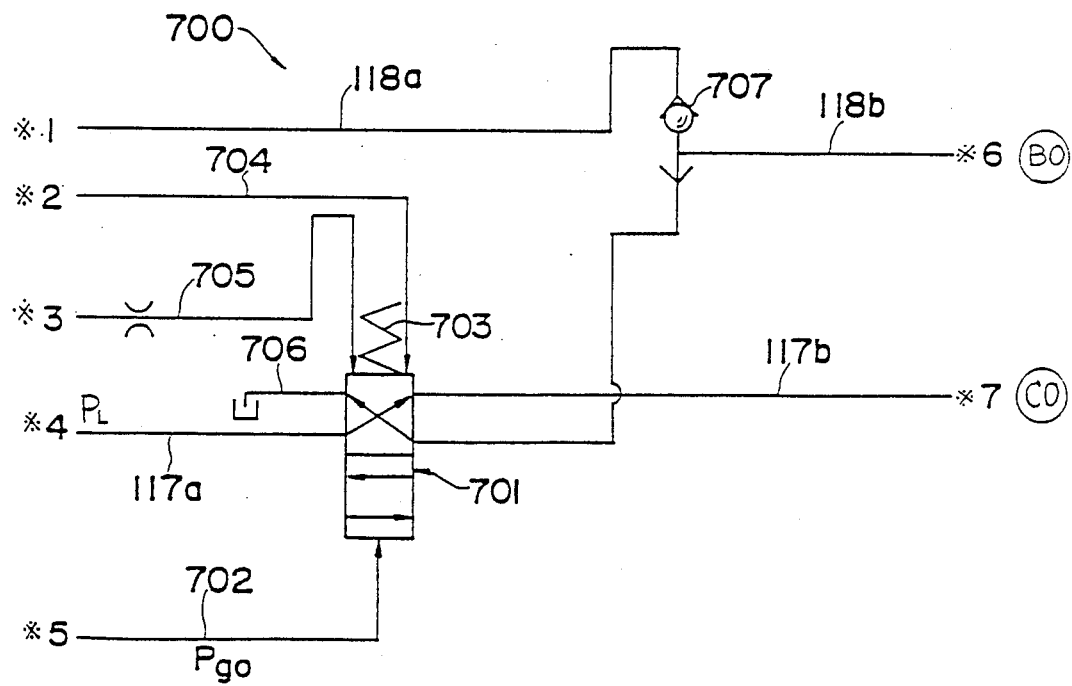
FIG. 3 is a circuit diagram illustrating an embodiment of the present invention.

Connected to the hydraulic control circuit of FIG. 2 is a 1.5 speed control circuit 700, of the type shown in FIG. 3, which includes a 1.5 speed shift valve 701. The connections are made at positions marked by the symbol *, which correspond to the similarly marked positions in FIG. 2.

More specifically, an oil line 702 is connected to an oil line 111 so that governor pressure $P_{g0}$ may act via the oil line 702 in a direction which displaces the 1.5 speed shift valve 701 upwardly in FIG. 3. The 1.5 speed shift valve 701 is biased downwardly in FIG. 3 by a spring 703. Further, an oil line 704 is connected to an oil line 108, and an oil line 705 is connected to the oil line 112, so that throttle pressure and hydraulic pressure that is received from the 1-2 shift valve 220 act in a direction which displaces the 1.5 speed shift valve 701 downwardly in FIG. 3.

If the 1.5 speed shift valve 701 is situated at its lower position in FIG. 3 so that the governor pressure $P_{g0}$ is low, an oil line 117a and an oil line 117b are connected to each other to introduce pressurized oil into the hydraulic cylinder 370 from the overdrive shift valve 270, and an oil line 118b is connected to a discharge oil line 706 to discharge pressurized oil from the hydraulic cylinder 400. An oil line 118a and the oil line 118b are connected to each other via a check valve 707.

In the operation of the 1.5 speed control circuit 700 described above, the 1.5 speed shift valve 701 is situated at its lower position in FIG. 3 when the governor pressure $P_{g0}$ is low. As a result, the oil lines 117a, 117b are connected together to introduce pressurized oil from the overdrive shift valve 270 to the hydraulic cylinder 370, whereby the clutch C0 is engaged. In addition, the oil line 118b is connected to the discharge oil line 706 to release the brake B0. First speed is established as a result.

If the vehicle velocity is now raised to make the governor pressure $P_{g0}$ exceed a certain value, the governor pressure $P_{g0}$ overcomes both the urging force of spring 703 and the throttle pressure from the oil line 704, thereby displacing the 1.5 speed shift valve 701 upwardly in FIG. 3. Consequently, oil line 117a is connected to oil line 118b so that pressurized oil from the overdrive shift valve 270 is introduced to the hydraulic cylinder 400 to engage the brake B0. Further, the oil line 117b is connected to the discharge oil line 706 so that the pressurized oil in the hydraulic cylinder 370 is discharged from the discharge oil line 706 to release the clutch C0. As a result, the overdrive unit is changed over to the high state while first speed remains in effect, thus establishing the 1.5 speed state.

If the vehicle velocity rises further to increase the governor pressure $P_{g0}$ up to the 1-2 shift operating point while the 1.5 speed state prevails, the 1-2 shift valve 220 is changed over, as described above, to introduce pressurized oil from oil line 104 to oil line 112. The pressurized oil introduced to oil line 112 acts upon the 1.5 speed shift valve 701 via the oil line 705, thereby changing over the 1.5 shift valve 701 by displacing it downwardly in FIG. 3. As a result, the clutch C0 is engaged and brake B0 is released to establish the second speed state described above.

A shift from the second speed state to the third speed state is performed by changing over the 2-3 shift valve 230 in response to a rise in governor pressure $P_{g0}$, thereby to engage the clutch C2 and release the brake B1.

A shift from the third speed state to the fourth speed (overdrive) state is performed by changing over the overdrive shift valve 270, which allows pressurized oil from the oil line 102 to flow into the hydraulic cylinder 400 via the oil line 118a, check valve 707 and oil line 118b to engage the brake B0 and release the clutch C0, is a manner similar to that described above.

FIG. 4 illustrates an auxiliary changeover device 800 connected to the 1.5 speed control circuit 700 of FIG. 3. The auxiliary changeover device 800 has an oil line 802 connected to the *5 position of oil line 111 in the hydraulic control circuit of FIG. 2, and an oil line 803 connected to the oil line 702 of the 1.5 speed control circuit 700, the arrangement being such that governor pressure $P_{g0}$ acts upon the 1.5 speed shift valve 701 through a changeover valve 801.

The changeover valve 801 is situated at its upper position in FIG. 4 under the urging force of a spring 804. Normally, therefore, the oil lines 802, 803 are connected to each other to allow the governor pressure $P_{g0}$ to act upon the 1.5 speed shift valve 701. The changeover valve 801 is displaced downwardly in FIG. 4 by operating a switch 805 provided at the driver's seat, thereby connecting the oil line 803 to the discharge oil line 806 to render the 1.5 speed shift valve 701 inoperative.

When the 1.5 speed shift valve 701 is rendered inoperative, a shift to the 1.5 speed cannot be made. Accordingly, a 1-1.5-2-3 shift pattern or 1-2-3 shift pattern can be selected by suitably operating the switch 805.

FIG. 5 illustrates another auxiliary changeover device 900 capable of being connected to the 1.5 speed control circuit 700 of FIG. 3 instead of the auxiliary changeover device 800. The auxiliary changeover device 900 has an oil line 902 connected to the *5 position of oil line 111 in the hydraulic control circuit of FIG. 2, and an oil line 903 connected to the oil line 702 of the 1.5 speed control circuit 700, the arrangement being such that governor pressure $P_{g0}$ acts upon the 1.5 speed shift valve 701 through a changeover valve 901. Further, an oil line 904 is connected to the *8 position of oil line 104 in the hydraulic control circuit of FIG. 2 so that line pressure $P_L$ is introduced. An oil line 906 is connected to a discharge oil line.

The changeover valve 901 is held at an intermediate position by springs 907, 908. Normally, therefore, the oil lines 902, 903 are connected to each other so that the governor pressure $P_{g0}$ is allowed to act upon the 1.5 speed changeover valve 701. When a switch 909 provided at the driver's seat is changed over to a side 910, the changeover valve 901 is displaced downwardly in FIG. 5 to connect the oil line 903 to the oil line 906, thereby rendering the 1.5 speed shift valve 701 inoperative. Consequently, shifting is changed over from the 1.5-2-3 pattern to the 1-2-3 pattern.

If the switch 909 is changed over to a side 911, on the other hand, the changeover valve 901 is displaced upwardly in FIG. 5 to connect the oil lines 903, 904 together, whereby the line pressure $P_L$ from oil line 104 acts upon the 1.5 speed shift valve 701 instead of the governor pressure $P_{g0}$. As a result, the 1.5 shift valve 701 in the 1.5 speed control circuit 700 of FIG. 3 is placed at its upper position by the line pressure from the oil line 104. Accordingly, the first speed state is omitted, so that shifting starts from the 1.5 speed state.

In accordance with the auxiliary changeover device 900, therefore, the 1.5-2-3 shift pattern or 1-2-3 shift pattern can be selected at will by operating the switch 909.

FIG. 6 illustrates another embodiment of the 1.5 speed control circuit. In this embodiment, the arrangement is such that the line pressure $P_L$ is controlled by a solenoid valve 1001 to switch a changeover valve 1000. Thus, the governor pressure $P_{g0}$ from the governor valve 260 is not utilized, unlike the control circuit of FIG. 3 which does use the governor pressure.

More specifically, the embodiment of FIG. 6 has an oil line 1002 connected to the *8 position of oil line 104 in the hydraulic pressure control circuit of FIG. 2, whereby the line pressure $P_L$ from the oil line 104 acts upon the changeover valve 1000. The oil line 1002 is also connected to a discharge oil line 1003 via the solenoid valve 1001. The latter is opened and closed by a CPU 1004 the inputs to which are data indicative of vehicle velocity V and vehicle inclination $\theta$.

The other oil lines of the changeover valve 1000 are connected in the same manner as those of the changeover valve 701 in FIG. 3 with the exception of the fact that throttle pressure from the oil line 108 is not applied.

The solenoid valve 1001 operates in the manner shown in Table 2 below.

TABLE 2

| Speed | Solenoid |
|---|---|
| 1st | Open |
| 1.5 | Closed |
| 2nd | Closed |
| 3rd | Closed |
| 4th | Closed |

In first speed, the solenoid valve 1001 is opened to connect the oil line 1002 with the discharge oil line 1003, thereby situating the changeover valve 1000 at its lower position in FIG. 6. When the vehicle velocity V rises or the vehicle inclination $\theta$ decreases, the solenoid valve 1001 is closed by a command from the CPU 1004, so that the line pressure $P_L$ acts upon the changeover valve 1000 via an oil line 1002. As a result, the changeover valve 1000 is switched to establish the 1.5 speed. Thereafter, a 1.5-2-3-4 shift may be performed as in the manner of the 1.5 speed control circuit 700 of FIG. 3.

The 1.5 speed control circuit of FIG. 6 can also be applied to an automatic transmission hydraulic control system using solenoid valve control, as disclosed in e.g. the specification of Japanese Patent KOKAI Publication No. 59-187161, on the basis of the fact that switching of the changeover valve 1000 is performed by control of the solenoid valve 1001.

The foregoing description relates to the formation of a 1.5 speed. However if the oil line 705 or 1005 of the 1.5 speed control circuit of FIG. 3 or 6 is connected to the *9 position of the oil line 113, rather than to the oil line 112, of the hydraulic control circuit shown in FIG. 2, this will make it possible to form a 2.5 speed in a manner similar to that in which the 1.5 speed was formed.

Figure 7A:
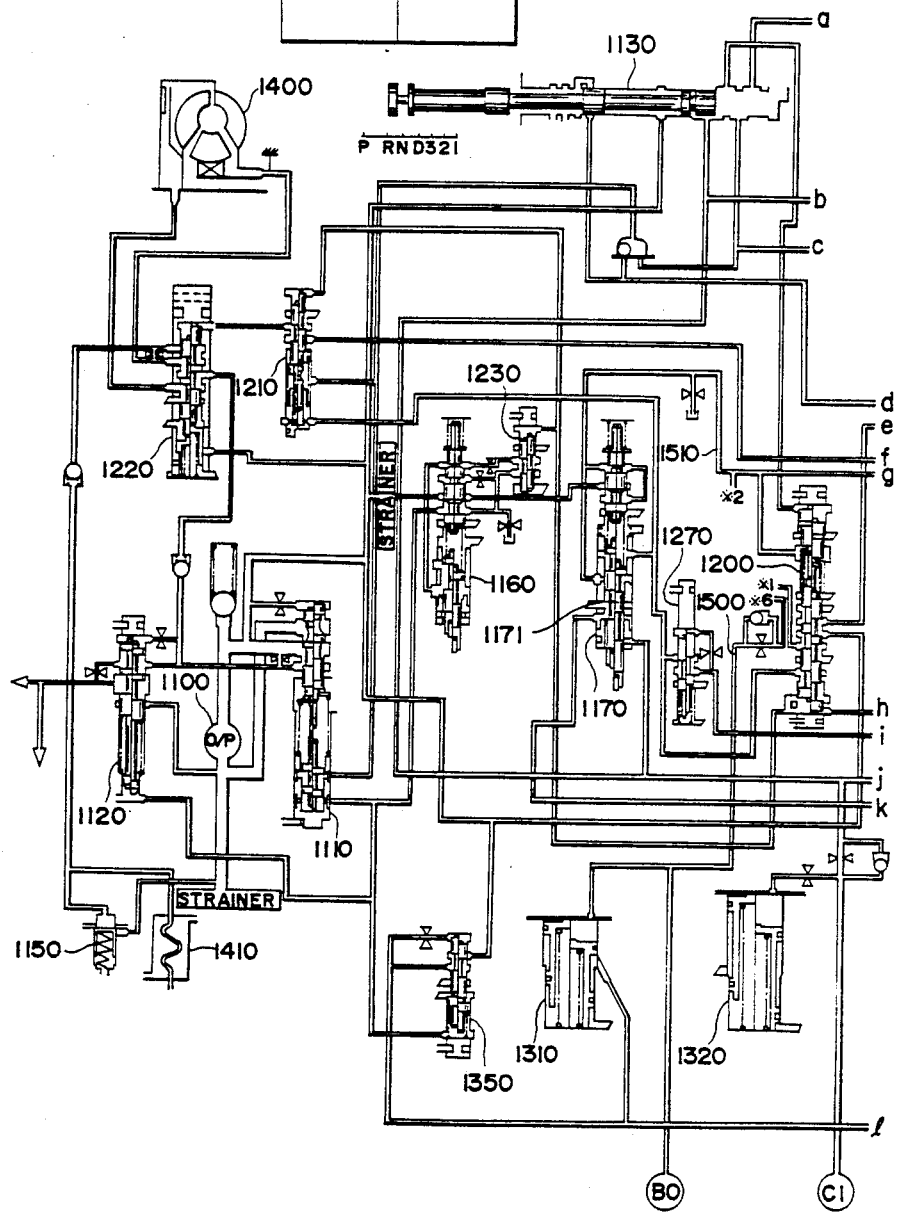
FIGS. 7A and 7B are a circuit diagram illustrating another hydraulic control circuit for an automatic transmission to which the present invention is applied.
Figure 7B:
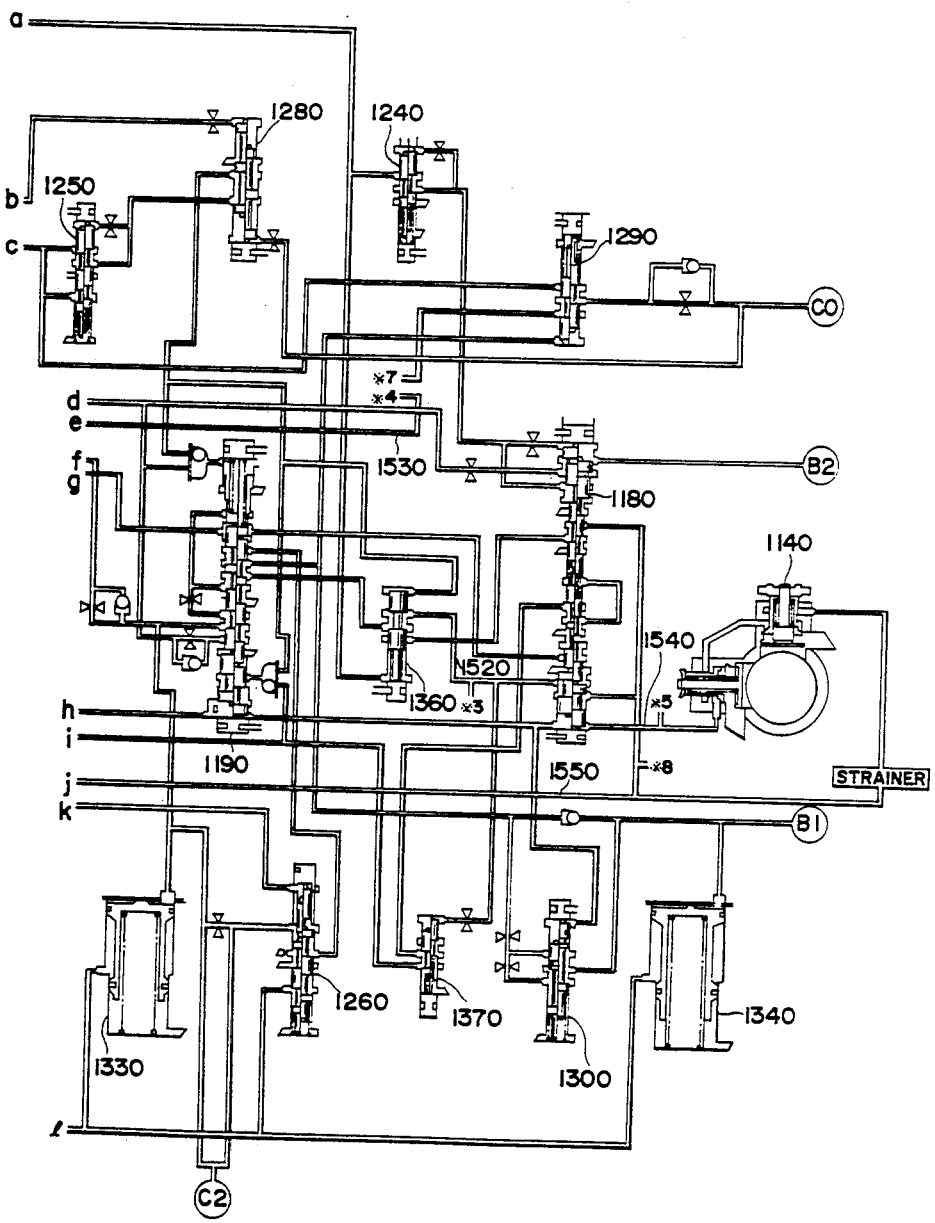

FIG. 7 illustrates a hydraulic control circuit to which the 1.5 speed control circuit of FIG. 6 is capable of being connected. Table 3 below illustrates the operation of the clutches C0, C1, C2, brakes B0, B1, B2 and oneway clutches F0, F2 at each speed of this hydraulic control circuit.

TABLE 3

| Shift Position | Gear | L/U | C0 | C1 | C2 | B0 | B1 | B2 | F0 | F2 | Gear Ratio |
|---|---|---|---|---|---|---|---|---|---|---|---|
| P | Parking | | | | | | | | | | — |
| R | Reverse | | | | | | | | | | 2.655 |
| N | Neutral | | | | | | | | | | — |
| D | 4th | Overdrive | | | | | | | | | 0.717 |
| | 3rd | Third | | | | | | | | | 1.000 |
| | 2nd | Second | | | | | | | | | 1.567 |
| | 1st | First | | | | | | | | | 3.075 |
| 3 | 3rd | Third | | | | | | | | | 1.000 |
| | 2nd | Second | | | | | | | | | 1.567 |
| | 1st | First | | | | | | | | | 3.075 |
| 2 | 2nd | Second | | | | | | | | | 1.567 |
| | 1st | First | | | | | | | | | 3.075 |
| L | 1st | First | | | | | | | | | 3.075 |

Actuated only at drive

The hydraulic control circuit of FIG. 7 includes an oil pump 1100, a primary regulator valve 1110, a secondary regulator valve 1120, a manual valve 1130, a governor valve 1140, a cooler bypass valve 1150, a primary throttle valve 1160, a secondary throttle valve 1170, a 1-2 shift valve 1180, a 2-3 shift valve 1190, a 3-4 shift valve 1200, a lock-up signal valve 1210, a lock-up relay valve 1220, a cut-back valve 1230, a low-coast modulator valve 1240, a second cost modulator valve 1250, a 2-3 shift timing valve 1260, a detent regulator valve 1270, a D-2 timing valve 1280, an overdrive clutch exhaust valve 1290, a 3-2 kick-down orifice control valve 1300, accumulators 1310, 1320, 1330, 1340, an accumulator control valve 1350, a second lock valve 1360, and a 1-2 relay valve 1370.

The cooler bypass valve 1150 is adapted to regulate pressure, which is supplied to a cooler 1410 for pressurized oil heated by a torque converter 1400, to a low value.

The primary throttle valve 1160 functions to provide a No. 1 throttle pressure commensurate with the amount of accelerator pedal depression, namely engine output. No. 1 throttle pressure is hydraulic pressure commensurate with primary throttle valve opening and acts upon the primary regualtor valve 1110, secondary regulator valve 1120 and accumulator control valve 1350, thereby regulating line pressure or accumulator control pressure to a pressure commensurate with the throttle valve opening.

The secondary throttle valve 1170 produces a No. 2 throttle pressure dependent upon the amount of accelerator pedal depression. This throttle pressure acts upon the 1-2 shift valve 1180, 2-3 shift valve 1190 and 3-4 shift valve and represents a force that resists governor pressure. The secondary throttle valve 1170 has a secondary downshift plug 1171 which feeds the No. 2 throttle pressure to the detent regulator valve 1270 in response to depression of the accelerator pedal, whereby detent regulator pressure is produced. When the valve 1170 is near the fully closed state, signal pressure indicative of the fully closed state is delivered to the 2-3 shift timing valve 1260.

The 1-2 shift valve 1180 is for effecting a changeover between first gear and second gear in response to balance between governor pressure and No. 2 throttle pressure. The No. 2 throttle pressure acts upon the upper portion of the 1-2 shift valve 1180, so that a downwardly acting force is produced which cooperates with the force produced by a spring. The governor pressure acts upon the lower portion of the 1-2 shift valve 1180 and produces an upwardly acting force. When the upwardly acting force produced by governor pressure is smaller than the resultant downwardly acting force, the valve is held on its lower side, thereby closing off the oil line leading to the piston of the second brake (B1) and maintaining the first gear state.

When vehicle velocity rises in the first gear state to such an extent that the upwardly acting force produced by governor pressure becomes larger than the resultant downwardly acting force produced by the No. 2 throttle pressure and spring, the 1-2 shift valve 1180 is urged upwardly to open the oil line to the piston of the second brake (B1), thereby effecting an upshift to second gear.

Once second gear has been attained, the oil line for No. 2 throttle pressure leading to the shift valve is closed, so that the force urging the 1-2 shift valve 1180 downwardly weakens, it being derived solely from the spring. In consequence, a downshift from second to first gear occurs at the instant the governor pressure becomes weaker than the spring force. Hysteresis is formed between vehicle velocity at the time of the upshift and vehicle velocity at the time of the downshift, so that the a constant vehicle velocity is maintained.

The detent regulator pressure acts upon the upper portion of the 1-2 shift valve 1180 at kick-down, thereby overcoming the governor pressure applied from below. The valve therefore is moved to its lower side to establish first gear.

When the shift lever is in the L range, the low-coast modulator pressure acts upon the shift valve. As a result, the 1-2 valve 1180 remains in the downwardly urged state. Consequently, first gear holds and there is no upshift to second gear. The oil line to the piston of the low-and-reverse brake (B2) is opened by the shift valve to establish a state that enables engine braking.

The 2-3 shift valve 1190 is for effecting a changeover between second and third gear in response to balance among governor pressure, No. 2 throttle pressure and spring force. The No. 2 throttle pressure acts upon the upper portion of the 2-3 shift valve 1190, so that a downwardly acting force is produced which cooperates with the force produced by a spring. The governor pressure acts upon the lower portion of the 2-3 shift valve 1190 and produces an upwardly acting force. When the upwardly acting force produced by governor pressure is smaller than the resultant downwardly acting force, the valve is held on its lower side, thereby closing off the oil line leading to the piston of the reverse clutch (C2) and opening the oil line to the piston of the second brake (B1) to maintain the second gear state.

When vehicle velocity rises in the second gear state to such an extent that the upwardly acting force produced by governor pressure becomes larger than the downwardly acting force produced by the No. 2 throttle pressure or spring, the 2-3 shift valve 1190 is urged upwardly to open the oil line to the piston of the reverse clutch (C2), thereby effecting an upshift to third gear.

Once third gear has been attained, the governor pressure which acted downwardly in second gear vanishes so that only an upwardly acting hydraulic pressure remains, thereby increasing the force that urges the 2-3 shift valve 1190 upwardly. A downshift will not take place unless governor pressure falls below the value it had at the time of the upshift. Thus, hysteresis between vehicle velocity at the time of the upshift and vehicle velocity at the time of the downshift is formed by changing the area of the 2-3 shift valve 1190 that receives the governor pressure. Since line pressure acts upon the 2-3 shift valve 1190 so as to overcome the spring pressure, the 2-3 shift valve 1190 is held in third gear until the line pressure is exhausted (i.e. until the first gear state is established) by the 1-2 shift valve 1180 at the time of a small valve opening (a throttle opening of less than about 30%). In other words, a shift is made from third directly to first at a small valve opening.

At kick-down the detent regulator pressure acts against the governor pressure applied from below. As a result, the valve is moved to its lower side to establish second gear.

When the shift lever is in the 2 range, the second coast modulator pressure acts upon the shift valve. When a set vehicle velocity is attained at which second coast modulator pressure and governor pressure are in balance, the 2-3 shift valve 1190 is urged downwardly to effect a shift from third gear to second gear. When the valve is urged downwardly, the valve no longer moves upward since the governor pressure is acting downwardly. Accordingly, an upshift to third gear is no longer carried out.

The 3-4 shift valve 1200 is for effecting a changeover between third gear and overdrive gear in response to balance between governor pressure and No. 2 throttle pressure. The No. 2 throttle pressure acts upon the upper portion of the 3-4 shift valve 1200, so that a downwardly acting force is produced which cooperates with the force produced by a spring. The governor pressure acts upon the lower portion of the 3-4 shift valve 1200 and produces an upwardly acting force. When the upwardly acting force produced by governor pressure is smaller than the downwardly acting force, the valve is held on its lower side, thereby closing off the oil line leading to the piston of the overdrive brake (B0) and opening the oil line leading to the piston of the overdrive clutch (C0) to maintain the third gear state.

When vehicle velocity rises in the third gear state to such an extent that the upwardly acting force produced by governor pressure becomes larger than the resultant downwardly acting force produced by the No. 2 throttle pressure and spring, the 3-4 shift valve 1200 is urged upwardly to open the oil line to the piston of the overdrive brake (B0), thereby establishing overdrive gear.

Once overdrive gear has been attained, the governor pressure which acted downwardly in third gear vanishes so that only an upwardly acting hydraulic pressure remains, thereby increasing the force that urges the 3-4 shift valve 1200 upwardly. A downshift will not take place unless governor pressure falls below the value it had at the time of the upshift. Thus, hysteresis between vehicle velocity at the time of the upshift and vehicle velocity at the time of the downshift is formed by changing the area of the 3-4 shift valve 1200 that receives the governor pressure.

At kick-down the No. 2 throttle pressure acts against the governor pressure applied from below. As a result, the valve is moved to its lower side to establish third gear.

When the shift lever is in the 3, 2 or L range, line pressure acts upon the upper portion of the third coast valve, so that the 2-4 shift valve 1200 remains in the downwardly urged state. When the valve is urged downwardly, the valve no longer moves upward since the governor pressure is acting downwardly.

The lock-up signal valve 1210 determines the lock-up actuation vehicle velocity, and the lock-up relay valve 1220 changes over the fluid flow to the torque converter 1400 to perform lock-up control when the vehicle is cruising in third gear or overdrive gear.

When governor pressure exceeds a set pressure value at the time that lock-up is in effect, the lock-up signal valve 1210 is urged downwardly and line pressure acts upon the upper side of the lock-up relay valve 1220. The lock-up relay valve 1220 is urged downwardly as a result.

When vehicle velocity falls below a set value at the time that lock-up is not in effect, governor pressure drops and the lock-up signal valve 1210 is urged upwardly by spring force. When this occurs, line pressure acting upon the upper portion of the lock-up relay valve 1220 is drained and the lock-up signal valve 1210 is urged upwardly.

The cut-back valve 1230 regulates the cut-back pressure acting upon the throttle valve 1160 during low vehicle velocity and is actuated by governor pressure and No. 1 throttle pressure.

Thus, by causing cut-back pressure to act upon the throttle valve 1160, the No. 1 throttle pressure is reduced to prevent unnecessary power due to the oil pump 1110.

The low-coast modulator valve 1240 is adapted to regulate the low-coast modulator pressure, which is for reducing transmission shock when shifting to the L range, from line pressure to low pressure.

The second coast modulator valve 1240 is adapted to regulate the second coast modulator pressure, which is for deciding the 3→2 shift point when shifting to the 2 range or L range, from line pressure to low pressure.

When the reverse clutch (C2) starts operating in a case where a shift is being made from second gear to third gear, the 2-3 shift timing valve 1260 causes the hydraulic pressure of the second brake (B1) to fall rapidly and provides an appropriate timing for the shift from second to third, thereby mitigating shock.

The detent regulator valve 1270 is adapted to govern the detent regulator pressure, which acts upon the 1-2 shift valve 1180 and 2-3 shift valve 1190 at kickdown, from No. 1 throttle pressure to a constant pressure.

The D-2 timing valve 1280 is for effecting an overdrive→third gear→second gear downshift when a shift is made to the 2 range during cruising in overdrive. This serves to smoothen engine braking.

The overdrive clutch exhaust valve 1290 is operable when shifting from third gear to second gear to bring the engine rotational speed to an rpm commensurate with second gear, thereby mitigating shock.

The 3-2 kickdown orifice control valve 1300 functions to delay, in dependence upon vehicle velocity, the actuation of the second brake (B1) set to the drop in the hydraulic pressure of the reverse clutch (C2).

The accumulators 1310, 1320, 1330 and 1340 act to reduce shock when the transmission is shifted. The accumulator control valve 1350 lowers the back pressures of the reverse clutch (C2), second brake (B1) and overdrive brake (B0) accumulator 1310 at a small throttle opening to obtain an accumulator control pressure, which mitigates transmission shock, from line pressure.

As for connecting the hydraulic control circuit of FIG. 7 to the 1.5 speed control circuit 700 of FIG. 3, the oil lines 118a and 118b; 704; 705; 117a and 117b; and 702 of the 1.5 speed control circuit 700 are connected respectively to the *1 and *6 positions of oil line 1500 connecting the 3-4 shift valve 1200 to the overdrive brake B0; the *2 position of oil line 1510 connecting the secondary throttle valve 1170 to the 3-4 shift valve 1200; the *3 position of oil line 1520 connecting the 1-2 shift valve to the second lock-up valve 1360; the *4 and *7 positions of oil line 1530 connecting the 3-4 shift valve 1200 to the overdrive clutch exhaust valve 1290; and the *5 position of oil line 1540 connecting the governor valve 1140 to the 1-2 shift valve 1180.

By thus connecting the 1.5 speed control circuit 700 thereto, the hydraulic control circuit causes the overdrive clutch C0 and overdrive brake B0 to changeover before an upshift is made from first speed to second speed, thereby forming the intermediate speed 1.5.

To connect the 1.5 speed control circuit of FIG. 6 or the auxiliary changeover device 900 of FIG. 5 to the hydraulic control circuit of FIG. 7, all that need be done is to connect the oil line 1002 in FIG. 6 or the oil line 904 in FIG. 5 to the *8 position of oil line 1550 connecting the manual valve 1130 and 1-2 shift valve 1180 of the hydraulic control circuit. This is followed by introducing line pressure.

As many apparently widely different embodiments of the present invention can be made without departing from the spirit and scope thereof, it is to be understood that the invention is not limited to the specific embodiments thereof except as defined in the appended claims.

What we claim is:

1. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve.

2. The control apparatus according to claim 1, wherein said third changeover valve is changed over by a hydraulic signal representing the vehicle velocity.

3. The control apparatus according to claim 2, wherein said hydraulic signal representing the vehicle velocity is a hydraulic pressure which is produced and exhausted by an electric signal representing the vehicle speed.

4. The control apparatus according to claim 3, wherein the control apparatus includes an electronic circuit to determine when the vehicle velocity rises above the changeover velocity of the first changeover valve.

5. The control apparatus according to claim 1, wherein said third changeover valve is changed over by a solenoid valve.

6. The control apparatus according to claim 1, wherein said auxiliary transmission mechanism has low and high speed ratios for establishing a first speed range and an overdrive speed range of the transmission, respectively.

7. The control apparatus according to claim 6, wherein said main transmission mechanism includes low and high speed ratios for establishing a second speed range and a third speed range of the transmission, respectively.

8. The control apparatus according to claim 7, wherein said main transmission mechanism includes a further higher speed ratio for establishing a fourth speed range of the transmission.

9. The control apparatus according to claim 1, wherein said third changeover valve is disposed in two hydraulic lines for supplying hydraulic fluid to two servo means for establishing said low and high speed ratios of the auxiliary transmission mechanism.

10. The control apparatus according to claim 9, wherein said third changeover valve is actuatable by a signal representing the vehicle velocity.

11. The control apparatus according to claim 9, wherein said third changeover valve changes-over between two states for communicating and interrupting communication of the hydraulic line with the servo means for establishing the high speed ratio of the auxiliary transmission mechanism.

12. The control apparatus according to claim 11, wherein said third changeover valve is urged to interrupt communication with the servo means for establishing the high speed ratio of the auxiliary transmission mechanism when a second speed range is established.

13. The control apparatus according to claim 9, wherein said servo means for establishing the high speed ratio of the auxiliary transmission mechanism is communicated with a hydraulic line for establishing an overdrive speed range via a check valve allowing flow towards the servo means for establishing said high speed ratio of the auxiliary transmission.

14. The control apparatus according to claim 9, wherein said servo means for establishing the high speed ratio of the auxiliary transmission mechanism is communicated with line pressure via said third changeover valve for establishing the high speed ratio of the auxiliary transmission mechanism.

15. The control apparatus according to claim 1, wherein said main and auxiliary transmission mechanisms are connected to form a power train in series.

16. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve, wherein said control apparatus includes a fourth changeover valve connected to said third changeover valve and changed over between a state that renders said third changeover valve operative and a state that renders said third changeover valve inoperative.

17. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve, wherein said control apparatus includes a further changeover valve connected to said third changeover valve and changed over among a state in which a hydraulic signal representing the vehicle velocity is made to act upon said third changeover valve, a state in which line pressure is made to act upon said third changeover valve, and a state in which said third changeover valve is rendered inoperative.

18. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve, said third changeover valve being positioned in two hydraulic lines for supplying hydraulic fluid to two servo means for establishing said low and high speed ratios of the auxiliary transmission mechanism and being actuatable by a signal representing the vehicle velocity, said third changeover valve being actuatable by a signal representing throttle opening and counteracting the signal representing the vehicle velocity.

19. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve, said third changeover valve being positioned in two hydraulic lines for supplying hydraulic fluid to two servo means for establishing said low and high speed ratios of the auxiliary transmission mechanism, said third changeover valve being actuatable further by a signal representing a state of a second speed range and counteracting the signal representing the vehicle velocity.

20. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve, said third changeover valve being changed over by a hydraulic signal representing the vehicle velocity wherein said hydraulic signal representing the vehicle velocity being governor pressure.

21. A control apparatus for an automatic transmission connected to a hydraulic control circuit having a first changeover valve for switching a main transmission mechanism having at least two speed ratios between high and low speed ratios in dependence upon at least vehicle velocity, and a second changeover valve for switching an auxiliary transmission mechanism, which is provided in addition to the main transmission mechanism and has at least two speed ratios, between high and low speed ratios at a vehicle velocity higher than a changeover velocity of the first changeover valve, said control apparatus comprising a third changeover valve for switching the auxiliary transmission mechanism from the low to the high speed ratio at a vehicle velocity lower than the changeover velocity of the first changeover valve, and from the high to the low speed ratio when the vehicle velocity rises above the changeover velocity of the first changeover valve, said third changeover valve being changed over by a hydraulic signal representing the vehicle velocity with said hydraulic signal representing the vehicle velocity being governor pressure, the third changeover valve including a spring acting against said governor pressure.

* * * * *